United States Patent Office 3,102,886
Patented Sept. 3, 1963

3,102,886
NEW WATER SOLUBLE DYESTUFFS OF THE PYRENE-QUINONE AND PYRENE-QUINONE-CARBAZOLE SERIES CAPABLE OF BEING CHEMICALLY FIXED ON FIBERS
Kurt Weber and Max Staeuble, Basel, Switzerland, assignors to Ciba Limited, Basel, Switzerland, a company of Switzerland
No Drawing. Filed Aug. 22, 1960, Ser. No. 50,866
Claims priority, application Switzerland Sept. 4, 1957
7 Claims. (Cl. 260—249.5)

This application is a continuation-in-part of our copending application Serial No. 757,121, filed August 25, 1958 (now abandoned).

This invention provides organic dyestuffs which contain as at least one chromophore a 3:8-pyrenequinone radical and also contain at least one acid group imparting solubility in water and a residue containing at least one reactive substituent, especially a mobile halogen atom.

As reactive substituents there are to be understood substituents which render possible a chemical fixation of the dyes containing them on the cellulosic material, i.e. substituents which contain double bonds as for example in the acryl radical or a mobile halogen atom, that is to say a halogen atom in α- or β-position of an aliphatic acyl radical or in a heterocyclic ring for example in a 1,3,5-triazine nucleus.

As radicals which contain at least one mobile halogen atom there may be mentioned, for example, the acyl radicals derived from halogenated aliphatic carboxylic acid which contains preferably at most 4 carbon atoms and a double bond in α,β-position or a halogen atom, for example, a chlorine or bromine atom in α- and/or β-position. As such acyl radical there may be mentioned the chloracetyl-, the β-chloracryl-, the chloromaleinyl-, the β-bromo- and the β-chloropropionyl-, the dichloropropionylamino group, and more especially a radical of the formula (1) 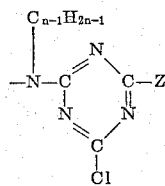

in which $n$ is a whole number not greater than 4, and Z represents a chlorine atom or an amino group which may be substituted or a substituted hydroxyl or mercapto group.

The aforesaid radical containing a mobile halogen atom, especially a radical of the Formula 1, may be bound to the pyrenequinone radical directly or through a methylene bridge or advantageously through a grouping of the formula (2) 

in which R represents a divalent organic radical, advantageously an alkylene or arylene radical. An alternative bridge member is a grouping of the formula (3) 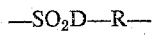

in which R has the meaning given above, and D represents an oxygen atom or an imino group.

The invention also provides a process for the manufacture of the new dyestuffs, wherein a 3:8-pyrenequinone, which contains at least one acylatable amino group, is acylated or condensed with an acylating agent, such as acrylic acid chloride or anhydride or a compound which contains at least two mobile halogen atoms, the starting materials being so chosen that at least one of them contains an acid group imparting solubility in water and the conditions being such that an acryl radical or at least one mobile halogen atom is present in the final product, and, if desired, when the product contains more than one mobile halogen atom, such further halogen atom or atoms is or are exchanged for another substituent or substituents.

As compounds which contain at least two mobile halogen atoms, there may be mentioned more especially compounds containing a 6-membered heterocyclic ring having at least two nitrogen atoms, for example, dichloro-1:3-diazines, and more especially trichloro-1:3:5-triazine (cyanuric chloride). Among compounds which contain an aliphatically bound mobile halogen atom there may be mentioned β-bromo- and β-chloropropionyl chloride, β-chloracrylic acid chloride, chloromaleic acid anhydride or dichloropropionyl chloride. Instead of cyanuric chloride there may be used a primary condensation product thereof, which contains two chlorine atoms and, in place of the third chlorine atom, a free amino group or an organic radical for example, the radical of an amine or of an alcohol, for instance methanol, or of a phenol or of a mercapto-compound. Such dichlorotriazines can be made by methods in themselves known from cyanuric chloride, for example, by reacting one molecular proportion of cyanuric chloride with one molecular proportion of an amino-, hydroxy- or mercapto-compound which may or may not possess the character of a dyestuff. As such compounds having the character of a dyestuff there may be mentioned, for example, amino-thioxanthones and amino-azo-dyestuffs such as those obtainable by coupling a diazo-compound, for example, diazotized aminobenzene sulfonic acids or diazotized aminonaphthalene sulfonic acids, with a coupling component containing an amino group, such as cresidine, meta-toluidine, meta-acylamino-anilines and the like, or amino-azo-dyestuffs obtainable by coupling a barbituric acid or pyrazolone, especially 1-phenyl-3-methyl-5-pyrazolone-2'- or -3'- or -4'-sulfonic acid, with a diazotized monoacyl derivative of an aromatic diamine, such as an acetylamino-aniline sulfonic acid, followed by hydrolysis of the acylamino-dyestuff so obtained. As compounds not possessing the character of a dyestuff there may be mentioned, for example, ammonia, aliphatic or aromatic hydroxyl-compounds, such as methyl alcohol, ethyl alcohol or butyl alcohol, or phenol, ortho-, meta- or para-cresol, 4-secondary butyl-phenol, 4-tertiary amyl-phenol, dialkyl-phenols, para-chloro-phenols, aliphatic or aromatic mercaptans such as methyl mercaptan, ethyl mercaptan or benzyl mercaptan, and alkali metal salts thereof, and also β-hydroxyethyl-mercaptan, thiophenol (phenyl mercaptan), thiophenol sulfonic acids, mercaptobenzoic acids, thioglycollic acid, mercapto-succinic acid (d:l-thiomalic acid) and the like, but more especially organic nitrogen compounds, such as methylamine, dimethylamine, ethylamine, diethylamine, isopropylamine, butylamine, hexylamine, phenylamine, tolylamine, 4-chlorophenylamine, N-methyl-phenylamine or cyclohexylamine, and also β-chlorethylamine, methoxyethylamine, γ-methoxy-propylamine, mono- or di-ethanolamine, acetamide, butyric acid amide, urea, thiourea, toluene sulfonic acid amide, glycine, aminocarbonic acid esters such as the methyl or ethyl ester, aminoacetic acid ethyl ester, amino-acetamide, aminoethane sulfonic acids, 1-aminobenzene-2- or -4-methyl sulfone, 1-amino-benzene 2:5-disulfonic acid, aminobenzoic acids, and their sulfonic acids, 1-aminobenzene-2- or -3- or -4-sulfonic acid or their sulfonamides or sulfones, phenyl-hydrazine and its sulfonic acids. The primary condensation products so obtained still contain two reactive halogen atoms. Those which are free from sulfonic acid groups are condensed only with dyestuffs containing at least one sulfonic acid group, and the primary condensation products which contain one or two sulfonic acid groups are also suitable for reaction with dyestuffs free from sulfonic acid groups. For making dyestuffs containing a single exchangeable chlorine atom, and replacing one or both of the chlorine atoms in such dichlorotriazine dyestuffs by reaction with ammonia or with an aliphatic or aromatic amino-, hydroxy- or mercapto-compound.

Suitable starting materials for the present process are 3:8-pyrenequinones that contain at least one acylatable amino group and preferably at least one sulfonic acid group. The acylatable amino group can be linked to the pyrenequinone radical either directly or preferably through a bridge member, for example a methylene group. Particularly valuable starting materials are pyrenequinones that contain at least one radical of formula (4)      —NH—R—NH$_2$ 

in which R represents an alkylene group, for example an ethylene gorup or preferably a benzene radical. Such compounds are obtained by reacting a 2:5:7:10-tetrachloro-3:8- or 1:3:6:8-tetrachloro-5:10-pyrenequinone of the formula (5)

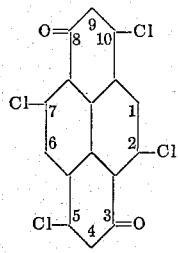

or (6)

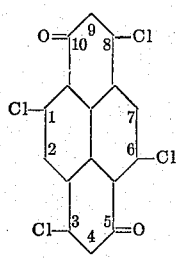

(which are readily accessible industrially) with 1 or 2 molecular proportions of an aliphatic diamine, for example ethylenediamine or more especially an aromatic diamine of the benzene series. Particularly valuable starting materials are obtained by reacting tetrachloropyrenequinone with 2 molecular proportions of an identical or one molecular proportion each of two different aromatic amines of which at least one must be a diamine. Suitable aromatic amines are above all the aminobenzenes, for example 1-aminobenzene, 1-amino-4-methylbenzene, 1-amino-3-chlorobenzene and 1:3- or 1:4-diaminobenzene.

Pyrenequinones that contain sulfonic acid groups and at least one radical of Formula 4 can be made by condensing a pyrenequinonesulfonic acid—obtained, for example, by reacting tetrachloro-pyrenequinone with sodium sulfite—with a diamine containing sulfonic acid groups, for example with 1:4-diaminobenzene-2-sulfonic acid or 1:3-di-aminobenzene-4-sulfonic acid; or by sulfonating a pyrene-quinone containing at least one radical of Formula 4. In the last-mentioned case, if R stands for a benzene radical whose ortho-positions to the —NH-group are unsubstituted, the sulfonation performed under even very mild conditions is probably accompanied by carbazole ring closure. For preventing carbazole ring closure it is recommended to use dyestuffs in which R contains in the ortho-positions to the binding —NH— group halogen atoms or alkyl groups.

The afore-mentioned starting material is reacted with the compound containing at least two mobile halogen atoms preferably in an aqueous solution. When the compound containing at least two mobile halogen atoms is cyanuric chloride, it is of advantage to add the alkali gradually in a manner such that the pH value of the solution does not rise above 8.

The dyestuffs obtained by the present process are new. They are valuable water-soluble dyestuffs suitable for dyeing and printing a wide variety of materials, for example wool, and more especially polyhydroxylated fibrous materials, including both synthetic fibers (for example of regenerated cellulose or viscose) and natural materials, for example linen and above all cotton.

The dyestuffs of the invention can be applied to the fiber by padding, printing or direct-dyeing and fixed thereon by an alkali treatment, for example with sodium carbonate, sodium hydroxide and alkaline earth metal hydroxide, trisoduim phosphate and the like, and then subjected to a heat treatment. Dyeing may be performed, for example, at a slightly raised to an elevated temperature, that is to say at 50° C. to 100° C., or in the cold, for example at about 20° C. to 50° C., when dichlorotriazine dyestuffs are used. To exhaust the dyebath it is of advantage to add to it, if desired in portions, together with the dyestuffs or during the dyeing process, more or less neutral, above all inorganic, salts such as alkali metal chlorides or sulfates. During the dyeing process the dyestuffs react with the polyhydroxylated material to be dyed probably by entering into a chemical bond with it to achieve fixation. The addition of an acid acceptor to the dyebath may be made at the start of the dyeing process; an alkaline agent is advantageously added so that the pH value of the dyebath— which at the start is weakly acid to neutral or weakly alkaline—gradually rises during the whole of the dyeing operation.

Instead of preparing the dyebath by dissolving the specified dyestuff and, if desired, more or less neutral inorganic salt, simultaneously or successively in water, the dyestuff and the salt can be made up together into pastes or preferably dry preparations. Since, owing to their content of labile substituents, some of the dyestuffs to be used in the present process have a certain sensitivity to acids and strong alkalies, it is of advantage, if possible, not to add to such dye preparations any salts whose aqueous solutions have a strong alkaline reaction. On the other hand it has proved advantageous to isolate and dry the dyestuffs in the presence of salts of weakly alkaline reaction, such as mixtures of mono- and disodium phosphates.

The dyestuffs of the invention containing at least one sulfonic acid group produce on polyhydroxylated (more especially cellulosic) textile materials very valuable strong, generally very full dyeings and prints of outstanding wet fastness and very good fastness to light.

In certain cases it may be of advantage to subject the dyeings obtained by the present process to an aftertreatment. Thus, it is of advantage to soap the dyeings obtained. By such an after-treatment any dyestuff that has not been completely fixed is removed.

Unless otherwise indicated, parts and percentages in the following examples are by weight, the relationship between parts by weight and parts by volume being the same as that between the gram and the cubic centimeter.

*Example 1*

A neutral solution is prepared from 3.3 parts of the condensation product, rendered water-soluble by sulfonation, of 1-anilino-3:6:8-trichloropyrene-5:10-quinone and 1:4-di-aminobenzene in 100 parts of water with the addition of dilute sodium hydroxide solution. A solution heated at 40° C. of 1.72 parts of 2:4-dichloro-6-phenylamino-1:3:5-triazine-4'-sulfonic acid (in the form of the sodium salt) in 100 parts of water is stirred in, and the temperature of the reaction mixture is raised to 60° C. The mineral acid eliminated during the condensation is advantageously neutralised, while continually checking the pH, by the gradual addition of 10 parts by volume of N-sodium hydroxide solution at a pH of 5.0 to 7.0.

On completion of the condensation, the dyestuff is salted out from its solution with sodium chloride, filtered off and dried in vacuo at 60 to 70° C. It corresponds to the formula

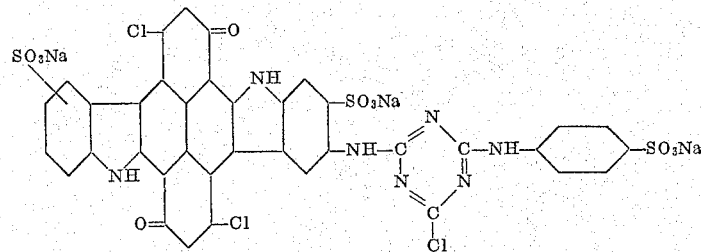

and dyes cotton and regenerated cellulose by the method described in Example 4 yellowish green tints of very good fastness to washing.

When in this example the 2:4-dichloro-6-phenylamino-1:3:5-triazine-4'-sulfonic acid used in the synthesis of the dyestuff is replaced by 2:4-dichloro-6-phenylamino-1:3:5-triazine-3'-sulfonic acid, or by 2:4-dichloro-6-phenylamino-1:3:5-triazine-2'-sulfonic acid, or by an equimolecular amount of the monocondensation product of 1-aminobenzene-2:5-disulfonic acid with cyanuric chloride, or of 2-amino-naphthalene-6-sulfonic acid with cyanuric chloride, dyestuffs having similar properties are obtained.

The sulfonated condensation product of 1-anilino-3:6:8-trichloropyrene-5:10-quinone and 1:4-diaminobenzene used in this example was prepared in the following manner:

A mixture of 15 parts of 1-anilino-3:6:8-trichloropyrene-5:10-quinone, 15 parts of 1:4-diaminobenzene, 15 parts of crystalline sodium acetate in 150 parts of nitrobenzene was stirred for 1 hour at the boil. After cooling, the crystallisate was filtered off, washed first with nitrobenzene then with much alcohol and finally with water, and dried, to yield 15 parts of 1-anilino-6-(4'-aminoanilino)-3:8-dichloropyrene-5:10-quinone as a green crystalline powder. To sulfonate this condensation product, 20 parts thereof were cautiously added to 370 parts of oleum (containing 5% of sulfur trioxide), and the mixture was stirred for 2 hours at 20 to 25° C., then poured into 1600 parts of ice water, and from the dark-green solution the sulfonic acid was precipitated by adding 300 parts of sodium chloride, filtered and washed with saturated sodium chloride solution until neutral. The moist filter cake was again dissolved in 800 parts of hot water, the solution filtered, and from the clear filtrate the product was again precipitated with 120 parts of sodium chloride, filtered and the filter cake was dried in vacuo at 100° C. The product obtained in this manner is a dark-green powder which dissolves readily in water with green coloration.

*Example 2*

A neutral solution in 100 parts of water containing sodium hydroxide solution is prepared from 3.6 parts of the di-condensation product of 2:5:7:10-tetrachloropyrene-3:8-quinone with 2:6-dimethylaniline and para-amino-acetanilide, which product was subsequently rendered water-soluble by sulfonation. A solution of 1.7 parts of 2:4-dichloro-6-phenylamino-1:3:5-triazine-3'-sulfonic acid (in the form of the sodium salt) in 100 parts of water is further added, and at 40 to 50° C. the mineral acid liberated during the condensation is continuously neutralized with 2 N-sodium carbonate solution with the use of a pH-meter.

On completion of the condensation the dyestuff is salted out with sodium chloride, filtered off and dried in vacuo at 60 to 70° C.

Cotton and regenerated cellulose are dyed with this dyestuff by the method described in Example 3 green tints which are very fast to washing.

The sulfonated dicondensation product of 2:5:7:10-tetrachloropyrene-3:8-quinone with 2:6-dimethylaniline and paraaminoacetanilide used in this example was prepared thus:

37 parts of 2:5:7:10-tetrachloropyrene-3:8-quinone were suspended in 400 parts of 2:6-dimethylaniline, and the suspension is stirred for 4½ hours at 100 to 105° C. and then for 3½ hours at 120 to 125° C. On cooling, the monocondensate crystallizes out in deep-red flakes. It was filtered off and washed with a small amount of dimethylaniline, then with alcohol and finally with warm water, and dried to yield 16.1 parts of 1-(2':6'-dimethylanilino)-3:6:8-trichloropyrene-5:10-quinone as a violet crystalline powder melting at 297–299° C.

13.7 parts of this product were then condensed with 18 parts of para-aminoacetanilide and 14 parts of sodium acetate in 120 parts of nitrobenzene as described in the last paragraph of Example 1, and then sulfonated with oleum (containing 5% of sulfur trioxide) as described there. A dark-green product was obtained which readily dissolves in water with green coloration.

*Example 3*

2 parts of the monochloro-triazine dyestuff obtained as described in Example 2 are mixed with 80 parts of trisodium phosphate and dissolved in 400 parts of water, and the solution is made up to 4000 parts. 80 parts of sodium chloride are added and 100 parts of a cotton fabric is entered in this dyebath, the temperature is raised within ½ hour to 60° C., another 80 parts of sodium chloride are added, the temperature is raised to 80° C. within 15 minutes and this temperature is maintained for ½ hour. The fabric is then rinsed and the resulting yellowish green dyeing is soaped for 15 minutes in a boiling 0.3% solution of a nonionic detergent; it possesses excellent properties of fastness.

*Example 4*

1 part of the dyestuff obtained as described in Example 1 is dissolved in 100 parts of water. A cotton fabric is impregnated with this solution on a padder at 80° C., and the surplus liquor is squeezed off until the weight of the fabric shows a residual increase of 75%. The impregnated fabric is dried, and then at room temperature impregnated with a solution containing per liter 10 grams of sodium hydroxide and 300 grams of sodium chloride, squeezed to a weight increase of 75% and steamed for 60 seconds at 100 to 101° C., rinsed, treated in sodium bicarbonate solution of 0.5% strength, rinsed, soaped for 15 minutes in a boiling 0.3% solution of a non-ionic detergent, rinsed and dried. A yellowish green dyeing results which is fixed fast to boiling.

*Example 5*

1 part of cyanuric chloride is dissolved in 5 parts of acetone and in a thin stream vigorously stirred into 15 parts of ice water. This cyanuric chloride suspension is treated with a neutral solution, cooled to 2° C., of 3.5 parts of the sulfonated condensation product, described in Example 1, of 1-anilino-3:6:8-trichloropyrene-5:10-quinone with 1:4-diamino-benzene in 100 parts of water. The mineral acid which is eliminated during the condensation which sets in immediately, is neutralized at 0 to 4° C. by adding dropwise a total of 2.6 parts by volume of 2 N-sodium carbonate solution in a manner such that the pH value of the condensation solution can be kept constant at 5.0 to 7.0. On completion of the condensation, the dyestuff is precipitated with sodium chloride, filtered off and washed with a sodium chloride solution of 10% strength which contains 23 parts of disodium phosphate and 14.5 parts of monopotassium phosphate per liter. The dyestuff is thoroughly suctioned off and then dried in vacuo at 30 to 35° C.

The resulting dyestuff dyes cotton and regenerated cellulose by the dyeing method described below yellowish green tints of very good fastness to washing and light.

*Dyeing method.*—2 parts of the dyestuff are dissolved in 2000 parts of cold water, and 100 parts of sodium carbonate solution of 10% strength and 250 parts of sodium chloride solution of 20% strength are added. 100 parts of well wetted cotton yarn are entered at 20 to 30° C. into the dyebath thus prepared, and after 30 minutes another 250 parts of 20% sodium chloride solution are added. Dyeing is continued for 60 minutes at 25 to 35° C. The resulting yellowish green dyeing is then thoroughly rinsed in cold water, soaped at 80 to 100° C., thoroughly rinsed in cold water and dried. A yellowish green dyeing is obtained which is fast to washing.

The dichloro-triazine dyestuff prepared as described in Example 5 can be dyed also by the method according to Example 5. In this case a much more bluish dyeing is obtained than by the cold-dyeing method described above.

*Example 6*

1 part of cyanuric chloride and 3.5 parts of the sulfonated condensation product, described in Example 1, of 1-anilino-3:6:8-trichloropyrene-5:10-quinone and 1:4-diaminobenzene are condensed to the dichlorotriazine derivative as described in Example 5. On completion of the condensation, 7.5 parts by volume of 2 N-ammonium hydroxide solution are slowly stirred in at PH=7.0 to 9.0 and at the same time the temperature is raised to 35° C., and the mixture then stirred on for 1 hour at 35° C., and the dyestuff is salted out with sodium chloride. It is filtered off and dried in vacuo at 60 to 70° C.

This dyestuff dyes cotton and regenerated cellulose by the methods described in Examples 4 and 10 green tints of very good fastness to washing and light.

*Example 7*

1 part of cyanuric chloride and 3.5 parts of the sulfonated condensation product of 1-anilino-3:6:8-trichloropyrene-5:10-quinone and 1:4-diaminobenzene are condensed to the dichlorotriazine derivative as described in Example 5. On completion of the monocondensation, a neutral solution of 3.5 parts of the above-mentioned sulfonated condensation product of 1-anilino-3:6:8-trichloropyrene-5:10-quinone and 1:4-diaminobenzene is run in. The mixture is heated with stirring to 40° C., and the mineral acid which is again eliminated during the condensation is neutralized at a pH of 5.0 to 7.0 with a total of 5 parts by volume of N-sodium hydroxide solution. The monochlorotriazine dyestuff is then salted out with sodium chloride, filtered off, and dried in vacuo at 70° C.

The dyestuff dyes cotton and regenerated cellulose by the methods described in Examples 4 and 10 green tints which possess very good fastness to washing and light.

*Example 8*

1 part of cyanuric chloride is dissolved in 5 parts of acetone and vigorously stirred in a fine stream into 15 parts of ice water. This cyanuric chloride solution is treated with a neutral solution, cooled to 0° C., of 2.1 parts of the sodium salt of 1-anilino-4-amino-thioxanthonesulfonic acid in 100 parts of water. The mineral acid gradually being eliminated during the condensation is neutralized at 0 to 4° C. by adding dropwise a total of 2.5 parts by volume of 2 N-sodium carbonate solution in a manner such that the solution can be maintained at a constant pH of 5.0 to 7.0. On completion of the condensation a neutral solution of 3.5 parts of the sulfonated condensation product of 1-anilino-3:6:8-trichloropyrene-5:10-quinone and 1:4-diaminobenzene in 100 parts of water is added. The mixture is heated to 40° C., and the mineral acid which is again eliminated during the condensation is neutralized at pH=6.0 to 7.0 by adding another 2.5 parts by volume of 2 N-sodium carbonate solution. The dyestuff is salted out with sodium chloride, filtered off and dried in vacuo at 70° C. It corresponds to the formula

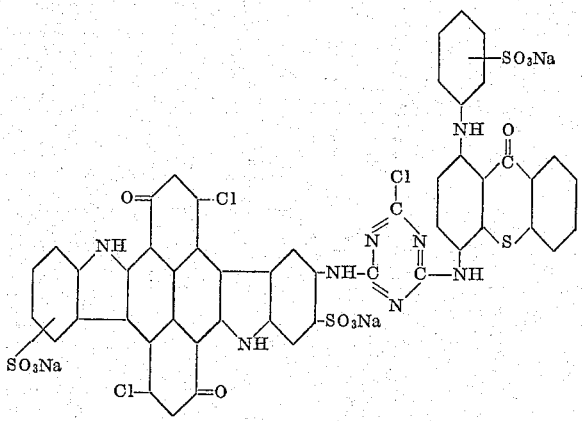

and dyes cotton and regenerated cellulose by the method described in Example 4 yellowish green tints of very good fastness to washing and light.

When the 2.1 parts of the sodium salt of 1-anilino-4-aminothioxanthonesulfonic acid are replaced by an equimolecular amount of sodium salt of 1:4-diamino-thioxanthonesulfonic acid, a dyestuff having similarly good properties is obtained.

The 1-anilino-4-amino-thioxanthonesulfonic acid and 1:4-diamino-thioxanthonesulfonic acid mentioned in this example can be prepared by the process described in our patent application Serial No. 702,510, filed December 13, 1957, now Patent No. 2,993,045.

*Example 9*

A solution of 1 part of cyanuric chloride in 5 parts of acetone is stirred in a fine stream into 15 parts of ice water. This cyanuric chloride suspension is treated with a neutral solution, cooled to 0° C., of 2.6 parts of the azo compound of the formula

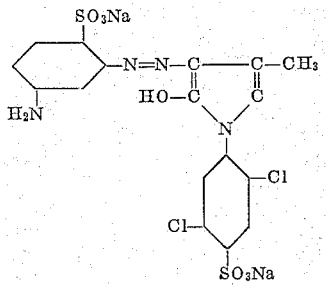

in 100 parts of water. The mineral acid, which is immediately eliminated during the condensation is neutralized at 0 to 4° C. by running in a total of 5 parts by volume of N-sodium hydroxide solution in a manner such that the pH value of the solution can be kept constant at 5.0 to 7.0. On completion of the condensation, a neutral solution of 3.5 parts of the sulfonated condensation product of 1-anilino-3:6:8-trichloropyrene-5:10-quinone and 1:4-diaminobenzene in 100 parts of water is added. The further condensation and subsequent isolation of the monochlorotriazine dyestuff are carried out as described in Example 8.

This dyestuff dyes cotton and regenerated cellulose by the method described in Example 4 yellowish green tints of very good fastness to washing and light.

*Example 10*

A neutral solution is prepared in 100 parts of water containing dilute sodium hydroxide solution, of 3.5 parts of the condensation product, rendered water-soluble by sulfonation, of 1 - anilino - 3:6:8 - trichloropyrene - 5:10-quinone and 1:4-diamino-benzene. While keeping this solution well stirred, it is treated at 0 to 2° C. with a solution of 2.5 parts of β-chloropropionyl chloride in 4 parts of toluene. The mineral acid which is eliminated during the acylation is continuously neutralized at 0 to 4° C. with N-sodium hydroxide solution in a manner such that the pH value of the solution is kept constant at 5.0 to 7.0. On completion of the reaction, when acid is no longer being eliminated, the pH of the solution is adjusted to 8.5 by adding further sodium hydroxide solution. The dyestuff is then salted out with sodium chloride, filtered off and dried in vacuo at 70 to 80° C.

The resulting dyestuff dyes cotton and regenerated cellulose by the method described below strong green tints of very good fastness to washing and light.

*Dyeing method.*—2 parts of this dyestuff are mixed with 25 parts of urea and dissolved in 75 parts of water. 2 parts of sodium carbonate are added to this solution which is used to impregnate a cotton fabric which is then squeezed to a residual weight increase of 75% and dried. The fabric is heated for 5 minutes at 150° C., rinsed and soaped. The resulting green dyeing is fixed fast to boiling.

*Example 11*

A neutral solution is prepared by dissolving in 200 parts of water and neutralizing with dilute sodium hydroxide solution 3.5 parts of the condensation product, rendered water-soluble by sulfonation, of 1-anilino-3,6,8-trichloropyrene-5,10-quinone and 1,4-diaminobenzene. The solution is stirred thoroughly and treated at 0 to 2° C. with a solution of 2.4 parts of chloracetyl chloride in 6 parts of toluene. The mineral acid which is formed is continuously neutralized at 0 to 4° C. with N-sodium hydroxide solution. When the reaction is complete and acid is no longer formed, the pH value of the solution is adjusted to 8.0. The dyestuff of the formula

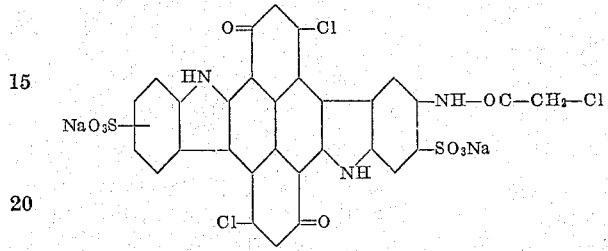

is then salted out of its solution with sodium chloride, isolated by filtration and dried at 60° C. in vacuo.

Cotton and regenerated cellulose are dyed full green tints of very good fastness to washing and light by the method described in Example 10.

*Example 12*

A neutral solution is prepared by dissolving in 200 parts of water containing dilute sodium hydroxide solution, 7 parts of the condensation product, rendered water-soluble by sulfonation, of 1-anilino-3,6,8-trichloro-pyrene-5,10-quinone and 1,3-diaminobenzene. To the well stirred solution there is added at 0 to 3° C. a solution of 6.4 parts of α,β-dichloropropionyl chloride in 7 parts of acetone. The mineral acid which is formed is continuously neutralized at 0 to 4° C. with N-sodium hydroxide solution. When the reaction is complete and acid is no longer being formed, the pH value of the solution is adjusted to 8.0. The dyestuff of the formula

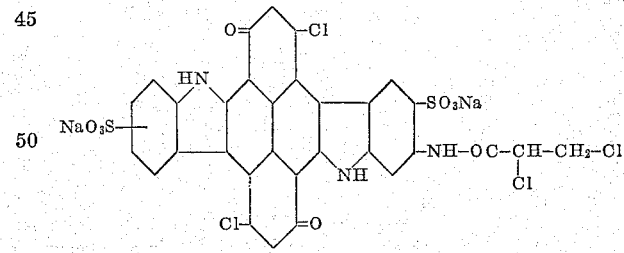

is then salted out of its solution with sodium chloride, isolated by filtration and dried at 60° C. in vacuo.

Cotton and regenerated cellulose are dyed yellow-green tints of very good fastness by the method described in Example 10.

If instead of α,β-dichloropropionyl chloride an equimolecular quantity of α,β-dibromopropionyl chloride is used, a dyestuff with similar properties is obtained.

The sulfonated condensation product of 1-anilino-3,6,8-trichloropyrene-5,10-quinone and 1,3-diaminobenzene used in this example may be prepared in an analogous manner to that described in the last paragraph of Example 1 by using 1,3-diaminobenzene instead of 1,4-diaminobenzene.

*Example 13*

A neutral solution is prepared by dissolving in 200 parts of water containing dilute sodium hydroxide solution, 3.5 parts of the condensation product, rendered water-soluble by sulfonation, of 1-anilino-3,6,8-trichloropyrene-5,10-quinone and 1,3-diaminobenzene. The solution is stirred vigorously and at 0 to 5° C. there is added a solution of 2.5 parts of α-chloracrylic acid chloride in 15 parts of acetone. The mineral acid which is eliminated is continuously neutralized at 0 to 5° C. with 2 N-sodium carbonate solution. When acid is no longer eliminated, the pH value of the solution is adjusted to 9.0. The dyestuff of the formula

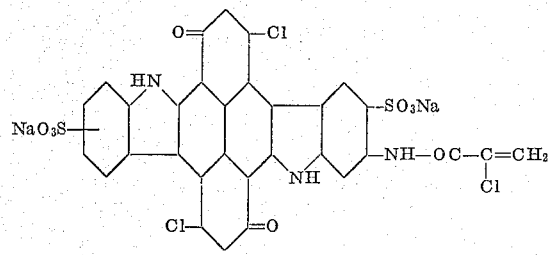

is then salted out of its solution with sodium chloride, isolated by filtration and dried at 60° C. in vacuo.

Cotton and regenerated cellulose are dyed yellow-green tints of very good fastness by the method described in Example 10.

If instead of α-chloracrylic acid chloride there is used an equimolecular quantity of acrylic acid chloride or of chloromaleic acid anhydride or of β-chloropropionyl chloride, dyestuffs with similar properties are obtained.

*Example 14*

1 part of cyanuric chloride and 3.5 parts of the sulfonated condensation product of 1-anilino-3,6,8-trichloro-pyrene-5,10-quinone and 1,4-diaminobenzene, described in Example 1, are condensed to form the dichlorotriazine derivative as described in Example 5. When condensation is complete, 0.6 part of β-hydroxyethylamine is added with vigorous stirring and the temperature increased to 40° C. After stirring for 3 hours at 35 to 40° C., the dyestuff is salted out of its solution by the addition of sodium chloride, isolated by filtration and dried at 70 to 80° C. in vacuo.

The dyestuff obtained in this manner corresponds to the formula

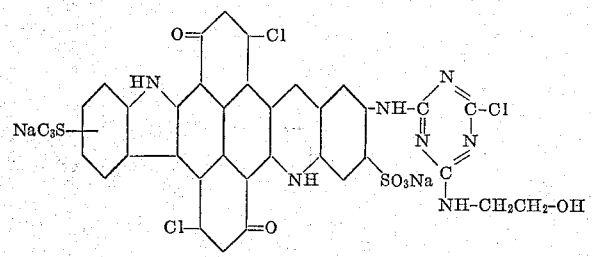

dyes cotton and regenerated cellulose green tints of very good fastness by the method described in Example 4.

*Examples 15–27*

In the following table other dyestuffs of the formula

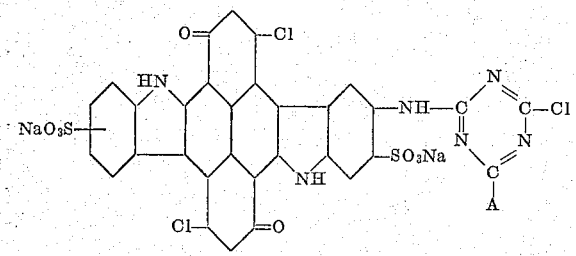

are listed in which A is an amino group which may be obtained by the method of Example 14 using instead of β-hydroxy-ethylamine the amines mentioned in column II; they dye cotton and regenerated cellulose very fast tints by the method described in Example 4.

| I No. | II |
|---|---|
| 15 | HN(CH₃)—CH₂CH₂—OH |
| 16 | HN(CH₂CH₂—OH)(CH₂CH₂—OH) |
| 17 | HNH—CH₂CH₂CH₂—OH |
| 18 | H₂N—⌬ |
| 19 | H₂N—⌬—Cl |
| 20 | H₂N—⌬—CH₃ |
| 21 | HN(CH₂CH₂)(CH₂—CH₂)O |
| 22 | HN(CH₂—CH₂)(CH₂—CH₂)CH₂ |
| 23 | H₂N—C(CH₃)(CH₃)—CH₂OH |
| 24 | H₂N—CH(CH₂OH)(C₂H₅) |
| 25 | H₂N—(CH₂)₂—NH—(CH₂)₂—OH |
| 26 | H₂N—⌬—COOH |
| 27 | H₂N—⌬(COOH) |

What is claimed is:

1. Dyestuff selected from the group consisting of water-soluble sulfonated dyestuff of the formula

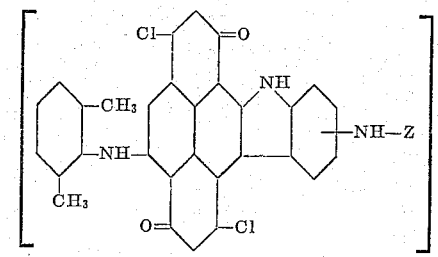

and dyestuff of the formula

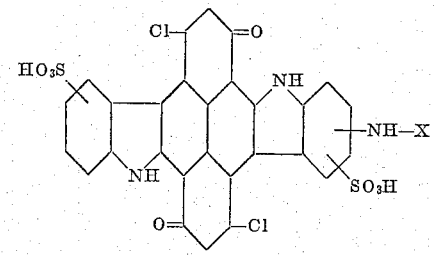

wherein X is a member selected from the group consisting of acryl, chloracryl, chloracetyl, β-chloropropionyl, α:β-dichloropropionyl, α:β-dibromopropionyl and monoand di-chloro-1:3:5-triazinyl radicals bound to the —NH-bridge in 6-position; and Z is 2-amino-4-chloro-1:3:5-triazinyl bound to the —NH-bridge in 6-position.

2. Water-soluble sulfonated dyestuff of the formula

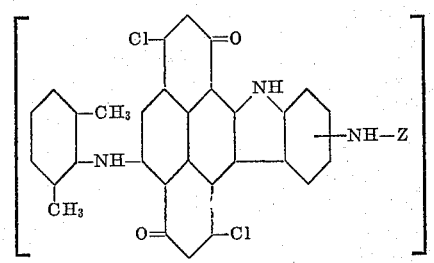

wherein Z is 2-amino-4-chloro-1:3:5-triazinyl bound to the —NH-bridge in 6-position.

3. The dyestuff of the formula

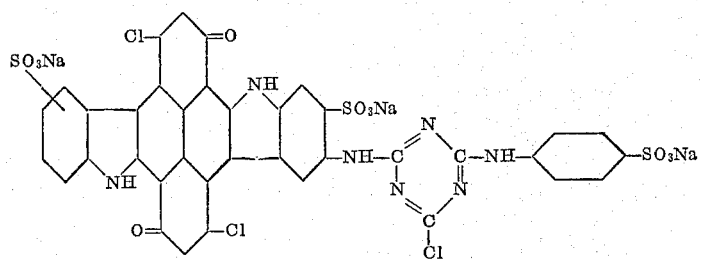

4. The dyestuff of the formula

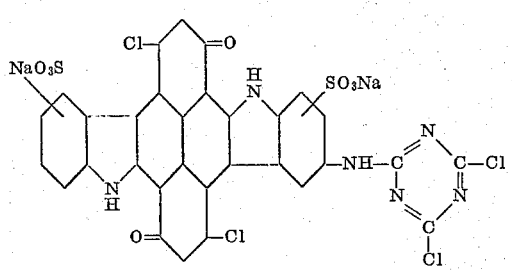

5. The dyestuff of the formula

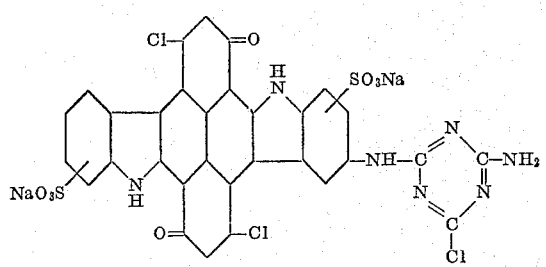

6. The dyestuff of the formula

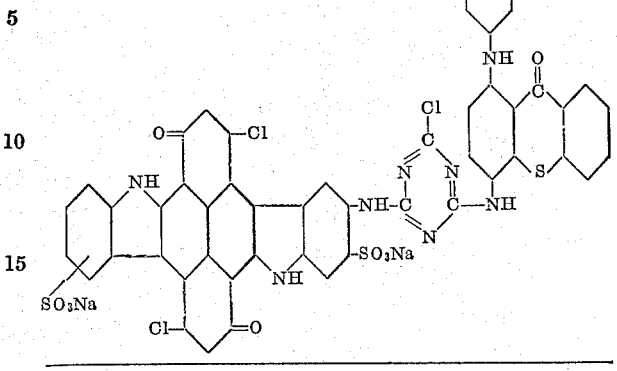

7. The dyestuff of the formula

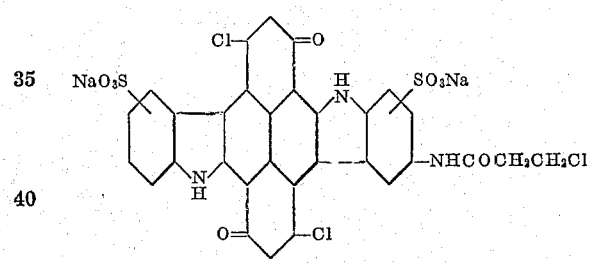

References Cited in the file of this patent
UNITED STATES PATENTS

| | | |
|---|---|---|
| 1,886,480 | Haller et al. | Nov. 8, 1932 |
| 2,213,697 | Fleishhauer et al. | Sept. 3, 1940 |

FOREIGN PATENTS

| | | |
|---|---|---|
| 91,206 | Norway | Jan. 18, 1958 |

OTHER REFERENCES

Vollmann et al.: Annalen der Chemie, volume 531, pages 24–28 and 101 to 102 (1937).

Schlaeppi: American Dyestuff Reporter, volume 47, No. 11, pages 377 to 378 and page 383 (June 2, 1958).

Wegmann: Textil-Praxis, pages 1056 to 1061 (October 1958).